United States Patent
Bae et al.

(10) Patent No.: US 9,859,541 B2
(45) Date of Patent: Jan. 2, 2018

(54) RECHARGEABLE LITHIUM BATTERY AND METHOD OF FABRICATING SAME

(71) Applicant: Samsung SDI Co., Ltd., Yongin-si, Gyeonggi-Do (KR)

(72) Inventors: Tae-Hyun Bae, Yongin-si (KR); Woo-Cheol Shin, Yongin-si (KR); Sang-Il Han, Yongin-si (KR); Sang-Hoon Kim, Yongin-si (KR); Duck-Hyun Kim, Yongin-si (KR); Byung-Joo Chung, Yongin-si (KR); Jung-Hyun Nam, Yongin-si (KR); Myung-Hwan Jeong, Yongin-si (KR); Jung-Yi Yu, Yongin-si (KR); Seung-Tae Lee, Yongin-si (KR); Mi-Hyun Lee, Yongin-si (KR); Eon-Mi Lee, Yongin-si (KR); Ha-Rim Lee, Yongin-si (KR); Moon-Sung Kim, Yongin-si (KR); In-Haeng Cho, Yongin-si (KR); E-Rang Cho, Yongin-si (KR); Dong-Myung Choi, Yongin-si (KR); Vladimir Egorov, Yongin-si (KR); Makhmut Khasanov, Yongin-si (KR); Pavel Alexandrovich Shatunov, Yongin-si (KR); Alexey Tereshchenko, Yongin-si (KR); Denis Chernyshov, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 437 days.

(21) Appl. No.: 14/135,324

(22) Filed: Dec. 19, 2013

(65) Prior Publication Data
US 2014/0308563 A1 Oct. 16, 2014

(30) Foreign Application Priority Data
Apr. 10, 2013 (KR) ........................ 10-2013-0039471

(51) Int. Cl.
*H01M 2/16* (2006.01)
*H01M 2/14* (2006.01)

(52) U.S. Cl.
CPC ......... *H01M 2/1686* (2013.01); *H01M 2/145* (2013.01); *H01M 2/166* (2013.01);
(Continued)

(58) Field of Classification Search
CPC . Y10T 29/49115; H01M 2/145; H01M 2/166; H01M 2/1646; H01M 2/1653; H01M 2/1686
See application file for complete search history.

(56) References Cited

U.S. PATENT DOCUMENTS

| | | | |
|---|---|---|---|
| 6,310,170 B1 | 10/2001 | Johnston et al. | |
| 2007/0281206 A1* | 12/2007 | Fujikawa | H01M 2/145 429/62 |
| 2011/0062378 A1* | 3/2011 | Chang | H01M 4/131 252/182.1 |

FOREIGN PATENT DOCUMENTS

| | | | |
|---|---|---|---|
| JP | 2002-042864 A | | 2/2002 |
| JP | 2002042864 A | * | 2/2002 |

(Continued)

OTHER PUBLICATIONS

Korean Office Action dated Dec. 14, 2016 for Korean Patent Application No. KR 10-2013-0039471, which cites the above-identified references numbered 1-3 and from which subject U.S. Appl. No. 14/135,324 claims priority.

*Primary Examiner* — Mark Kaucher
(74) *Attorney, Agent, or Firm* — Knobbe Martens Olson & Bear LLP

(57) ABSTRACT

In an aspect, a rechargeable lithium battery that includes a positive electrode; negative electrode; a separator interposed between the positive electrode and the negative electrode and including a porous substrate and a coating layer formed (Continued)

on at least one side of the porous substrate; and an electrolyte including a lithium salt, a non-aqueous organic solvent, and an additive is provided.

10 Claims, 4 Drawing Sheets

(52) U.S. Cl.
CPC ....... *H01M 2/1646* (2013.01); *H01M 2/1653* (2013.01); *Y10T 29/49115* (2015.01)

(56)  References Cited

FOREIGN PATENT DOCUMENTS

| | | |
|---|---|---|
| JP | 2007-324073 A | 12/2007 |
| KR | 10-0813309 B1 | 3/2008 |
| KR | 10-0877161 B1 | 12/2008 |
| KR | 10-2010-0081950 A | 7/2010 |
| KR | 10-2012-0104759 A | 9/2012 |

* cited by examiner

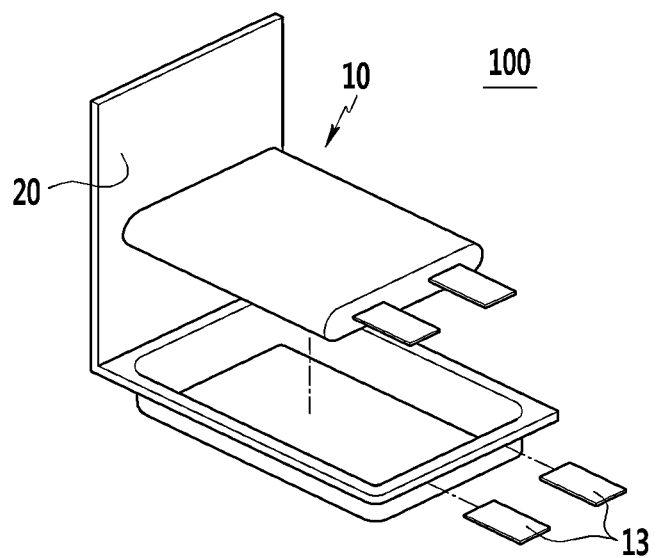

RECHARGEABLE LITHIUM BATTERY AND METHOD OF FABRICATING SAME

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2013-0039471 filed in the Korean Intellectual Property Office on Apr. 10, 2013, the disclosure of which is incorporated herein by reference in its entirety.

BACKGROUND

Field

This disclosure relates to a rechargeable lithium battery and a method of fabricating the same.

Description of the Related Technology

Polymer-type rechargeable lithium batteries may be fabricated to have various shapes such as a thin film allowing incorporation into small devices such as a smart phone, a tablet PC, a net book, and the like.

Such a rechargeable lithium battery includes an electrolyte, a positive electrode, and a negative electrode.

However, polymer-type rechargeable lithium batteries may have safety problems due to internal gas generation despite the aforementioned advantages.

SUMMARY

Some embodiments provide a rechargeable lithium battery having high adherence between an electrode and a separator and improved safety.

Some embodiments provide a method of fabricating the rechargeable lithium battery.

Some embodiments provide a rechargeable lithium battery that a positive electrode; a negative electrode; a separator interposed between the positive electrode and the negative electrode and including a porous substrate having a coating layer formed on at least one side of the porous substrate; and an electrolyte including a lithium salt, a non-aqueous organic solvent, and an additive, wherein the coating layer includes a fluorine-based polymer, a ceramic, or a combination thereof, and the additive includes a compound represented by the following Chemical Formula 1.

Some embodiments provide a rechargeable lithium battery that includes a positive electrode; a negative electrode; a separator interposed between the positive electrode and the negative electrode and including a porous substrate having a coating layer formed on at least one side of the porous substrate; and an electrolyte including a lithium salt and a non-aqueous organic solvent, wherein the coating layer includes a fluorine-based polymer, a ceramic, or a combination thereof, and an additive, where the additive includes a compound represented by Chemical Formula 1.

Chemical Formula 1 wherein, in Chemical Formula 1, $R^1$ to $R^4$ are each independently a hydrogen atom, a substituted or unsubstituted C1 to C20 alkyl group, a substituted or unsubstituted C2 to C20 alkenyl group, a substituted or unsubstituted C2 to C20 alkynyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C3 to C20 cycloalkynyl group, a substituted or unsubstituted C6 to C30 aryl group, a substituent represented by the following Chemical Formula 2, or a substituent represented by the following Chemical Formula 3, and at least one of the $R^1$ to $R^4$ is the substituted or unsubstituted C1 to C20 alkoxy group, and at least other one of the $R^1$ to $R^4$ is a substituent represented by Chemical Formula 2 or a substituent represented by Chemical Formula 3.

Chemical Formula 2

In some embodiments of Chemical Formula 2, n may be an integer ranging from 0 to 10.

Chemical Formula 3

In some embodiments of Chemical Formula 3, n may be an integer ranging from 0 to 10.

In some embodiments, the porous substrate may include a polyolefin resin.

In some embodiments, the fluorine-based polymer may include polyvinylidenefluoride (PVdF), a polyvinylidenefluoride-hexafluoropropylene (PVdF-HFP) copolymer, or a combination thereof.

In some embodiments, the ceramic may include $Al_2O_3$, MgO, $TiO_2$, $Al(OH)_3$, $Mg(OH)_2$, $Ti(OH)_4$, or a combination thereof.

In some embodiments, the coating layer may have a thickness of about 1 μm to about 10 μm.

In some embodiments, the coating layer may further include a heat-resistance resin including an aramid resin, a polyamideimide resin, a polyimide resin, or a combination thereof.

In some embodiments, the compound represented by Chemical Formula 1 may include a compound represented by Chemical Formula 4, a compound represented by the following Chemical Formula 5, or a combination thereof.

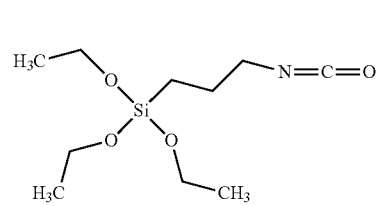

Chemical Formula 4

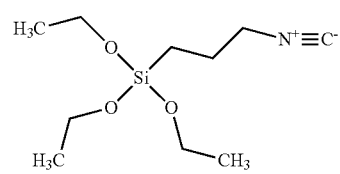

Chemical Formula 5

In some embodiments, the compound represented by Chemical Formula 1 may be included in an amount of about 1 part to about 15 parts by weight based on 100 parts by weight of the non-aqueous organic solvent.

In some embodiments, the additive may further include fluoroethylene carbonate, vinylethylene carbonate, propane sultone, succinonitrile, adiponitrile, or a combination thereof.

Some embodiments provide a method of fabricating a rechargeable lithium battery that includes coating at least one side of a porous substrate with a coating layer material to fabricate a separator; preparing an electrode assembly including the separator, a positive electrode, and a negative electrode; putting the electrode assembly into a battery case; mixing a lithium salt, a non-aqueous organic solvent, and an additive to prepare an electrolyte; injecting the electrolyte into the battery case; and heating and pressing the battery case including the electrolyte, wherein the coating layer material includes a fluorine-based polymer, a ceramic, or a combination thereof, and the additive includes the compound represented by Chemical Formula 1.

Some embodiments provide a method of fabricating a rechargeable lithium battery that includes coating at least one side of a porous substrate with a coating layer material to fabricate a separator; preparing an electrode assembly including the separator, a positive electrode, and a negative electrode; putting the electrode assembly into a battery case; mixing a lithium salt, and a non-aqueous organic solvent to prepare an electrolyte; injecting the electrolyte into the battery case; and heating and pressing the battery case including the electrolyte, wherein the coating layer material includes a fluorine-based polymer, a ceramic, or a combination thereof, and an additive, and the additive includes a compound represented Chemical Formula 1.

In some embodiments, the heating and pressing may be performed at a temperature of about 90° C. to about 105° C., at a pressure of about 180 kgf to about 210 kgf, for about 60 seconds to about 90 seconds.

In some embodiments, the compound represented by Chemical Formula 1 may be included in an amount of about 1 part to about 15 parts by weight based on 100 parts by weight of the non-aqueous organic solvent.

Hereinafter, further embodiments will be described in the detailed description.

In some embodiments, a rechargeable lithium battery having high adherence between an electrode and a separator and improved safety may be provided.

BRIEF DESCRIPTION OF THE DRAWINGS

FIG. 1 is a schematic view showing a rechargeable lithium battery according to one embodiment.

DETAILED DESCRIPTION

Figure 2A:
FIGS. 2A and 2B are photographs showing adherence between an electrode and a separator test of each Example 1 and Comparative Example 1.

Exemplary embodiments will hereinafter be described in detail. However, these embodiments are only exemplary, and the present disclosure is not limited thereto.

As used herein, when a definition is not otherwise provided, the term 'substituted' may refer to one substituted with a substitutent selected from a halogen (F, Br, Cl or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

As used herein, "$C_a$ to $C_b$" or "$C_{a-b}$" in which "a" and "b" are integers refer to the number of carbon atoms in the specified group. That is, the group can contain from "a" to "b", inclusive, carbon atoms. Thus, for example, a "C1 to C4 alkyl" or "$C_{1-4}$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—.

As used herein, the term "alkyl" refers to a branched or unbranched aliphatic hydrocarbon group. In some embodiments, alkyls may be substituted or unsubstituted. Alkyls include, but are not limited to, methyl, ethyl, propyl, isopropyl, butyl, isobutyl, tertiary butyl, pentyl, hexyl, and the like, each of which may be optionally substituted. In some embodiments, the alkyl may have from 1 to 6 carbon atoms. For example, $C_{1-6}$alkyl includes, but is not limited to, methyl, ethyl, propyl, isopropyl, butyl, iso-butyl, sec-butyl, pentyl, 3-pentyl, hexyl, and the like.

As used herein, the term "alkoxy" refers to the formula —OR wherein R is an alkyl as is defined above, such as "$C_{1-9}$ alkoxy", including but not limited to methoxy, ethoxy, n-propoxy, 1-methylethoxy (isopropoxy), n-butoxy, iso-butoxy, sec-butoxy, and tert-butoxy, and the like.

As used herein, the term "cycloalkyl" refers to a fully saturated carbocyclyl ring or ring system. Examples include cyclopropyl, cyclobutyl, cyclopentyl, and cyclohexyl.

As used herein, the term "alkenyl" refers to an acyclic hydrocarbon group of from two to twenty carbon atoms containing at least one carbon-carbon double bond including, but not limited to, ethenyl, 1-propenyl, 2-propenyl, 2-methyl-1-propenyl, 1-butenyl, 2-butenyl, and the like. In some embodiments, alkenyls may be substituted or unsubstituted. In some embodiments, the alkenyl may from 2 to 40 carbon atoms.

As used herein, the term "alkynyl" refers to a hydrocarbon group of from two to twenty carbon atoms containing at least one carbon-carbon triple bond including, but not limited to, ethynyl, 1-propynyl, 1-butynyl, 2-butynyl, and the like. In some embodiments, alkynyls may be substituted or unsubstituted. In some embodiments, the alkynyl may have from 2 to 4 carbon atoms.

As used herein, the term "aromatic" refers to a ring or ring system having a conjugated pi electron system and includes both carbocyclic aromatic (e.g., phenyl) and heterocyclic aromatic groups (e.g., pyridine). The term includes monocyclic or fused-ring polycyclic (i.e., rings which share adjacent pairs of atoms) groups provided that the entire ring system is aromatic.

As used herein, the term "aryl" refers to an aromatic ring or ring system (i.e., two or more fused rings that share two adjacent carbon atoms) containing only carbon in the ring backbone. When the aryl is a ring system, every ring in the system is aromatic. Examples of aryl groups include, but are not limited to, phenyl, biphenyl, naphthyl, phenanthrenyl, naphthacenyl, and the like. In some embodiments, aryls may be substituted or unsubstituted.

As used herein, the term "heteroaryl" refers to an aromatic ring system radical in which one or more ring atoms are not carbon, namely heteroatom, having one ring or multiple fused rings. In fused ring systems, the one or more heteroatoms may be present in only one of the rings. Examples of heteroatoms include, but are not limited to, oxygen, sulfur and nitrogen. Examples of heteroaryl groups include, but are not limited to, furanyl, thienyl, imidazolyl, quinazolinyl, quinolinyl, isoquinolinyl, quinoxalinyl, pyridinyl, pyrrolyl, oxazolyl, indolyl, and the like.

As used herein, "cycloalkenyl" refers to a cyclic hydrocarbon group of from three to fifteen carbon atoms containing at least one double bond, wherein no ring in the ring system is aromatic including, but not limited to, cyclopropenyl, cyclopentenyl, cyclohexenyl, cycloheptenyl and the like.

As used herein, the term "cycloalkynyl" refers to a cyclic hydrocarbon group of from three to fifteen carbon atoms containing at least one carbon-carbon triple bond.

As used herein, "heterocycloalkyl" refers to a non-aromatic cyclic ring or ring system containing at least one heteroatom in the ring backbone.

As used herein, "heteroalkyl" means an alkyl group containing at least one heteroatom.

As used herein, the term "arylalkyl" refers to an aryl group connected, as a substituent, via an alkylene group, such as "$C_{7-14}$ arylalkyl" and the like, including but not limited to benzyl, 2-phenylethyl, 3-phenylpropyl, and naphthylethyl. In some cases, the alkylene group is a lower alkylene group (i.e., a $C_{1-4}$ alkylene group).

As used herein, the term "heteroarylalkyl" refers to an heteroaryl group connected, as a substituent, via an alkylene group.

A rechargeable lithium battery according to one embodiment is described referring to FIG. 1.

FIG. 1 is a schematic view showing a rechargeable lithium battery according to one embodiment.

Referring to FIG. 1, the rechargeable lithium battery 100 according to embodiment includes an electrode assembly 10, a battery case 20 including the electrode assembly 10, and an electrode tab 13 that play a role of an electricity path for externally drawing current generated in the electrode assembly 10. In some embodiments, two facing sides of the battery case 20 are overlapped and sealed. In some embodiments, an electrolyte is injected into the battery case 20 containing the electrode assembly 10.

In some embodiments, the electrode assembly 10 includes a positive electrode, a negative electrode facing the positive electrode, and a separator interposed between the positive electrode and the negative electrode.

In some embodiments, the separator includes a porous substrate and a coating layer formed on at least one side of the porous substrate.

In some embodiments, the porous substrate may include a polyolefin resin. In some embodiments, the polyolefin resin may include a polyethylene-based resin, a polypropylene-based resin, or a combination thereof.

In some embodiments, the coating layer may include a fluorine-based polymer, a ceramic, or a combination thereof. In some embodiments, the fluorine-based polymer and the ceramic may be used together.

When the fluorine-based polymer is coated on at least one side of the porous substrate to manufacture a separator, the fluorine-based polymer is physically cross-linked with binders that are respectively present in the positive and negative electrodes, which further improves adherence between the separator and the electrodes.

When the ceramic is coated on at least one side of the porous substrate of a separator, the porous substrate may be structurally prevented from directly contacting active material layers that are respectively present on the positive and negative electrodes. When the porous substrate directly contacts the active material layers, active materials work as an oxidizing catalyst and thus, oxidizes the porous substrate and elutes metal ions, but, the elution of metal ions may be suppressed by coating the porous substrate with the ceramic.

In this way, a separator having the coating layer on at least one side of the porous substrate has excellent adherence to an electrode and thus, realize a rechargeable lithium battery having excellent safety and cycle-life characteristic.

In some embodiments, the fluorine-based polymer may include polyvinylidene fluoride (PVdF), a polyvinylidene fluoride-hexafluoropropylene (PVdF-HFP) copolymer, or a combination thereof.

In some embodiments, the ceramic may include $Al_2O_3$, MgO, $TiO_2$, $Al(OH)_3$, $Mg(OH)_2$, $Ti(OH)_4$, or a combination thereof.

In some embodiments, the ceramic may have an average particle diameter of about 50 μm to about 500 μm. When the ceramic has an average particle diameter within the range, the ceramic may be uniformly coated on at least one side of the porous substrate.

In some embodiments, the coating layer may further include a heat-resistance resin including an aramid resin, a polyamideimide resin, a polyimide resin, or a combination thereof.

In some embodiments, the coating layer may have a thickness of about 1 μm to about 10 μm, and specifically about 1 μm to about 8 μm. When the coating layer has a thickness within the range, the coating layer may accomplish excellent heat resistance and suppress thermal shrinkage and elution of metal ions.

In some embodiments, the electrolyte may include a lithium salt, a non-aqueous organic solvent, and an additive.

In some embodiments, the additive may be a compound represented by the following Chemical Formula 1.

Chemical Formula 1 wherein, in Chemical Formula 1, $R^1$ to $R^4$ are each independently a hydrogen atom, a substituted or unsubstituted C1 to C20 alkyl group, a substituted or unsubstituted C2 to C20 alkenyl group, a substituted or unsubstituted C2 to C20 alkynyl group, a substituted or unsubstituted C1 to C20 alkoxy group, a substituted or unsubstituted C3 to C20 cycloalkyl group, a substituted or unsubstituted C3 to C20 cycloalkenyl group, a substituted or unsubstituted C3 to C20 cycloalkynyl group, a substituted or unsubstituted C6 to C30 aryl group, a substituent represented by Chemical Formula 2 or a substituent represented by Chemical Formula 3, and at least one of the $R^1$ to $R^4$ is the substituted or unsubstituted C1 to C20 alkoxy group, and at least other one of the $R^1$ to $R^4$ is a substituent represented by Chemical Formula 2 or a substituent represented by Chemical Formula 3.

Chemical Formula 2

In some embodiments of Chemical Formula 2, n may be an integer ranging from 0 to 10.

Chemical Formula 3

In some embodiments of Chemical Formula 3, n may be an integer ranging from 0 to 10.

When the compound represented by Chemical Formula 1 reacts during a thermal process to fabricate a rechargeable lithium battery and specifically, a pouch-type rechargeable lithium battery, at least one alkoxy group of the silane compound is bonded with a binder in an electrode or a coating layer component forming a separator. Accordingly, adherence between the electrode and the separator may be further improved.

Examples of the compound may include a compound having the substituted or unsubstituted C1 to C20 alkoxy group for at least two of the $R^1$ to $R^4$ in Chemical Formula 1 and specifically, a compound having the substituted or unsubstituted C1 to C20 alkoxy group for three of the $R^1$ to $R^4$. In some embodiments, further substitution of alkoxy group improves adherence between the electrode and the separator.

Specific examples of the compound represented by Chemical Formula 1 may be a compound represented by the following Chemical Formula 4, a compound represented by the following Chemical Formula 5, and the like, but are not limited thereto.

Chemical Formula 4

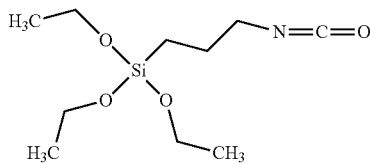

Chemical Formula 5

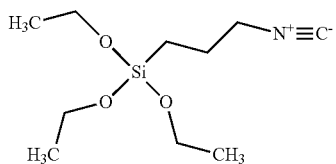

In some embodiments, the compound represented by Chemical Formula 1 may be included in an amount of about 1 part to about 15 parts by weight, specifically about 1 part to about 10 parts by weight, and more specifically about 2 parts to about 5 parts by weight based on 100 parts by weight of the non-aqueous organic solvent. When the compound represented by the above Chemical Formula 1 is used within the above range, adherence between the electrode and the separator may be more improved.

In some embodiments, the additive may further include fluoroethylene carbonate, vinylethylene carbonate, propane sultone, succinonitrile, adiponitrile, or a combination thereof.

In some embodiments, the lithium salt is dissolved in a non-aqueous organic solvent, supplies lithium ions in a battery, basically operates the rechargeable lithium battery, and improves lithium ion transportation between positive and negative electrodes therein.

In some embodiments, the lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers of 1 to 20, respectively), LiCl, LiI, $LiB(C_2O_4)_2$ (lithium bis(oxalato)borate), or a combination thereof.

In some embodiments, the lithium salt may be used in a concentration ranging from about 0.1 M to about 2.0 M. When the lithium salt is included within the above concentration range, an electrolyte may have improved performance and lithium ion mobility due to optimal electrolyte conductivity and viscosity.

The non-aqueous organic solvent serves as a medium for transmitting ions taking part in the electrochemical reaction of a battery. In some embodiments, the non-aqueous organic solvent may be selected from a carbonate-based, ester-based, ether-based, ketone-based, alcohol-based, or aprotic solvent.

In some embodiments, the carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When the linear carbonate compounds and cyclic carbonate compounds are mixed, an organic solvent having high dielectric constant and low viscosity may be provided. The cyclic carbonate and the linear carbonate are mixed together in a volume ratio ranging from about 1:1 to about 1:9.

In some embodiments, the ester-based solvent may include, for example methylacetate, ethylacetate, n-propylacetate, dimethylacetate, methylpropinonate, ethylpropinonate, γ-butyrolactone, decanolide, valerolactone, mevalonolactone, caprolactone, and the like. In some embodiments, the ether solvent may include, for example dibutylether, tetraglyme, diglyme, dimethoxyethane, 2-methyltetrahydrofuran, tetrahydrofuran, and the like, and ketone-based solvent may include cyclohexanone, and the like. In some embodiments, the alcohol-based solvent may include, for example ethanol, isopropyl alcohol, and the like.

In some embodiments, the non-aqueous organic solvent may be used singularly or in a mixture. When the organic solvent is used in a mixture, the mixture ratio may be controlled in accordance with a desirable battery performance.

In some embodiments, the positive electrode may include a current collector and a positive active material layer on the current collector. In some embodiments, the positive active material layer may include a positive active material, a binder, and a conductive material.

In some embodiments, the current collector may be Al (aluminum) but is not limited thereto.

In some embodiments, the positive active material includes lithiated intercalation compounds that reversibly intercalate and deintercalate lithium ions. In some embodiments, the positive active material may include a composite oxide including at least one of cobalt, manganese, nickel, or a combination thereof as well as lithium, and examples thereof may be the following compounds may be used:

$Li_aA_{1-b}B^1_bD^1_2$ (0.90≤a≤1.8 and 0≤b≤0.5); $Li_aE_{1-b}B^1_b O_{2-c}D^1_c$ (0.90≤a≤1.8, 0≤b≤0.5, 0≤c≤0.05); $LiE_{2-b}B^1_b O_{4-c}D^1_c$ (0≤b≤0.5, 0≤c≤0.05); $Li_aNi_{1-b-c}Co_bB^1_cD^1_\alpha$ (0.90≤a≤1.8, 0≤b≤0.5, 0≤c≤0.05, 0≤α≤2); $Li_aNi_{1-b-c}Co_bB^1_cO_{2-\alpha}F^1_\alpha$ (0.90≤a≤1.8, 0≤b≤0.5, 0≤c≤0.05, 0≤α≤2); $Li_aNi_{1-b-c}Co_bB^1_cO_{2-\alpha}F^1_2$ (0.90≤a≤1.8, 0≤b≤0.5, 0≤c≤0.05, 0≤α≤2); $Li_aNi_{1-b-c}Mn_bB^1_cD^1_\alpha$ (0.90≤a≤1.8, 0≤b≤0.5, 0≤c≤0.05, 0≤α≤2); $Li_aNi_{1-b-c}Mn_bB^1_cO_{2-\alpha}F^1_\alpha$ (0.90≤a≤1.8, 0≤b≤0.5, 0≤c≤0.05, 0≤α≤2); $Li_aNi_{1-b-c}Mn_bB^1_cO_{2-\alpha}F^1_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_c Mn_dGeO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_a CoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A may be Ni, Co, Mn, or a combination thereof; $B^1$ may be Al, Ni, Co, Mn, Cr, Fe, Mg, Sr, V, a rare earth element, or a combination thereof; $D^1$ may be O (oxygen), F (fluorine), S (sulfur), P (phosphorus), or a combination thereof; E may be Co, Mn, or a combination thereof; $F^1$ may be F (fluorine), S (sulfur), P (phosphorus), or a combination thereof; G may be Al, Cr, Mn, Fe, Mg, La, Ce, Sr, V, or a combination thereof; Q may be Ti, Mo, Mn, or a combination thereof; $I^1$ may be Cr, V, Fe, Sc, Y, or a combination thereof; and J may be V, Cr, Mn, Co, Ni, Cu, or a combination thereof.

In some embodiments, the positive active material may include the positive active material with the coating layer thereon, or a compound of the active material and the active material coated with the coating layer. In some embodiments, the coating layer may include at least one coating element compound selected from an oxide and a hydroxide of the coating element, an oxyhydroxide of the coating element, an oxycarbonate of the coating element, and a hydroxycarbonate of the coating element. In some embodiments, the compound for the coating layer may be either amorphous or crystalline. In some embodiments, the coating element included in the coating layer may be Mg, Al, Co, K, Na, Ca, Si, Ti, V, Sn, Ge, Ga, B, As, Zr, or a mixture thereof. In some embodiments, the coating process may include any conventional processes unless it causes any side effects on the properties of the positive active material (e.g., spray coating, immersing), which is well known to persons having ordinary skill in this art, so a detailed description thereof is omitted.

In some embodiments, the binder improves binding properties of the positive active material particles to one another and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the conductive material improves electrical conductivity of a negative electrode. Any electrically conductive material may be used as a conductive agent, unless it causes a chemical change. Examples of the conductive material include natural graphite, artificial graphite, carbon black, acetylene black, ketjen black, a carbon fiber, a metal powder or a metal fiber of copper, nickel, aluminum, silver, and the like, and a polyphenylene derivative, which may be used singularly or as a mixture thereof.

In some embodiments, the positive electrode may be fabricated in a method including the positive active material, the conductive material, and the binder in a solvent to prepare a positive active material composition, and coating the positive active material composition on the current collector. In some embodiments, the solvent may be N-methylpyrrolidone but is not limited thereto.

In some embodiments, the negative electrode includes a current collector and a negative active material layer disposed on the current collector.

In some embodiments, the current collector may include a copper foil.

In some embodiments, the negative active material layer may include a negative active material, a binder, and optionally a conductive material.

In some embodiments, the negative active material includes a material that reversibly intercalates/deintercalates lithium ions, a lithium metal, a lithium metal alloy, a material being capable of doping/dedoping lithium, or a transition metal oxide.

In some embodiments, the material that may reversibly intercalate/deintercalate lithium ions includes a carbon material. In some embodiments, the carbon material may be any generally-used carbon-based negative active material in a lithium ion rechargeable battery. Examples of the carbon material include crystalline carbon, amorphous carbon, and mixtures thereof. In some embodiments, the crystalline carbon may be non-shaped, or sheet, flake, spherical, or fiber shaped natural graphite or artificial graphite. In some embodiments, the amorphous carbon may be a soft carbon, a hard carbon, a mesophase pitch carbonization product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

In some embodiments, the material being capable of doping/dedoping lithium may include Si, $SiO_x$ (0<x<2), a Si—C composite, a Si-Q alloy (wherein Q is selected from an alkali metal, an alkaline-earth metal, Group 13 to Group 16 elements, a transition element, a rare earth element, and a combination thereof, and not Si), Sn, $SnO_2$, a Sn—C composite, a Sn—R alloy (wherein R is selected from an alkali metal, an alkaline-earth metal, Group 13 to Group 16 elements, a transition element, a rare earth element, and a combination thereof, and not Sn), and the like. In some embodiments, at least one of these materials may be mixed with $SiO_2$. Specific elements of Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. In some embodiments, specific elements of Q and R may be magnesium (Mg), calcium (Ca), strontium (Sr), barium (Ba), radium (Ra), scandium (Sc), yttrium (Y), titanium (Ti), zirconium (Zr), chromium (Cr), molybdenum (Mo), tungsten (W), iron (Fe), lead (Pb), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), or tellurium (Te).

In some embodiments, the transition metal oxide may include vanadium oxide, lithium vanadium oxide, and the like.

In some embodiments, the binder improves binding properties of negative active material particles with one another and with a current collector. The binder includes a non-water-soluble binder, a water-soluble binder, or a combination thereof. The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth) acrylic acid alkyl ester, or a combination thereof. When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 parts by weight to about 3 parts by weight based on 100 parts by weight of the negative active material.

In some embodiments, the conductive material is included to improve electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fibers, and the like; metal-based materials of metal powder or metal fiber including copper, nickel, aluminum, silver; conductive polymers such as polyphenylene derivatives; or a mixture thereof.

In some embodiments, the negative electrode may be fabricated in a method including mixing the negative active material, the binder, and optionally, the conductive material in a solvent to prepare a negative active material composition, and coating the negative active material composition on the current collector. The solvent may be N-methylpyrrolidone but is not limited thereto.

According to one embodiment, when a silane compound having an alkoxy group as described above is used as an additive for an electrolyte, adherence between the separator having a coating layer on at least one side of a porous substrate and the electrode may be further improved. In some embodiments, the silane compound having an alkoxy group may be used as an additive for forming a coating layer coated on at least one side of a porous substrate during fabrication of a separator. In this case, the reaction of the additive may also improve adherence between the separator and an electrode.

In some embodiments, the rechargeable lithium battery may be fabricated according to the following methods.

As a first method, a rechargeable lithium battery according to one embodiment may be the following method that includes coating at least one side of the above-described porous substrate with a coating layer material including a fluorine-based polymer, a ceramic, or a combination thereof to fabricate a separator; preparing an electrode assembly including the separator, the positive electrode, and the negative electrode the separator; putting the electrode assembly into a battery case; mixing the lithium salt, the non-aqueous organic solvent, and the additive to prepare an electrolyte; injecting the electrolyte into the battery case; and heating and pressing the battery case including the electrolyte.

According to the first method, a rechargeable lithium battery is manufactured by separately manufacturing a separator having a coating layer on at least one side of a porous substrate and using an electrolyte prepared by adding the aforementioned additive. This separator has excellent adherence to an electrode and may realize excellent safety and cycle-life characteristic of the rechargeable lithium battery.

As a second method, a rechargeable lithium battery according to one embodiment may be the following method that includes coating at least one side of the above-described porous substrate with a coating layer material including a fluorine-based polymer, a ceramic, or a combination thereof, and an additive to fabricate a separator; preparing an electrode assembly including the separator, the positive electrode and the negative electrode; putting the electrode assembly into a battery case; mixing the lithium salt and the non-aqueous organic solvent to prepare an electrolyte; injecting the electrolyte into the battery case; and heating and pressing the battery case including the electrolyte.

In the first and the second fabricating methods, the coating layer on the separator may be formed by using a coating composition including a ceramic, a fluorine-based polymer and a solvent. The solvent may be acetone, but it is limited thereinto.

In the first and second fabricating methods, the additive, specifically the compound represented by the above Chemical Formula 1 may be mixed in an amount of about 1 part to about 15 parts by weight, specifically about 1 part to about 10 parts by weight, and more specifically about 2 parts to about 5 parts by weight based on 100 parts by weight of the non-aqueous organic solvent. When the compound represented by the above Chemical Formula 1 is mixed within the above range, adherence between the electrode and the separator may be more improved.

In the first and second methods, the battery case may be heated and pressed, so that the compound represented by the above Chemical Formula 1 and added as an additive during preparation of the electrolyte or during formation of a coating layer of the separator is reacted and thus, may further improve adherence between the electrode and the separator.

In some embodiments, the heating and pressing may be performed at a temperature of about 90° C. to about 105° C. In some embodiments, the heating and pressing may be performed at a temperature of about 95° C. to about 98° C. Within the temperature range, a reaction of the compound represented by the above Chemical Formula 1 carry out actively, adherence between the electrode and the separator may be improved, and thus battery capacity characteristic may be also improved.

In some embodiments, the heating and pressing may be performed at a pressure of about 180 kgf to about 210 kgf, and specifically about 195 kgf to about 200 kgf. Within the pressure range, a reaction of the compound represented by the above Chemical Formula 1 carry out actively, adherence between the electrode and the separator may be improved, and thus battery capacity characteristic may be also improved.

In some embodiments, the heating and pressing may be performed for about 60 seconds to about 90 seconds. In some embodiments, the heating and pressing may be performed for about 70 seconds to about 80 seconds. Within the time range, a reaction of the compound represented by Chemical Formula 1 carry out actively, adherence between the electrode and the separator may be improved, and thus battery capacity characteristic may be also improved.

Exemplary embodiments will hereinafter be described in the detailed description. These examples, however, are not in any sense to be interpreted as limiting the scope of the disclosure.

Furthermore, what is not described in this disclosure may be sufficiently understood by those who have knowledge in this field and will not be illustrated here.

Example 1

(1) A positive active material composition was prepared by adding 96 wt % of $LiCoO_2$, 2 wt % of carbon black, and 2 wt % of polyvinylidenefluoride to an N-methylpyrrolidone (NMP) solvent. The positive active material composition was coated on an aluminum (Al) thin film, dried, and roll-pressed, manufacturing a positive electrode.

(2) A negative active material composition was prepared by adding 98 wt % of graphite, 1.5 wt % of carboxylmethylcellulose, and 0.5 wt % of a styrene-butadiene rubber to distilled water. The negative active material composition was coated on a copper foil, dried, and roll-pressed, fabricating a negative electrode.

(3) An electrolyte was prepared by mixing ethylene carbonate, propylene carbonate, ethylmethyl carbonate, and diethyl carbonate in a volume ratio of 25:5:40:30 to prepare a mixed solvent and adding 1.15M LiPF$_6$, 10 parts by weight of fluoroethylene carbonate (based on 100 parts by weight of the mixed solvent), and 2 parts by weight of a compound represented by Chemical Formula 4 (based on 100 parts by weight of the mixed solvent) thereto.

(4) A separator was fabricated by coating a coating material prepared by mixing 2 parts by weight of Al$_2$O$_3$ having an average particle diameter of 200 μm and 5 parts by weight of polyvinylidenefluoride (PVdF) in 93 parts by weight of an acetone solvent on a polyethylene porous substrate.

(5) The positive and negative electrodes and the separator were used to fabricate an electrode assembly. Then, the electrode assembly was put in a battery case, and the electrolyte was injected into the battery case. The battery case injected by the electrolyte was heated and pressed at 96° C. with a pressure of 200 kgf for 80 seconds, fabricating a rechargeable lithium battery cell.

Comparative Example 1

A rechargeable lithium battery cell was fabricated according to the same method as Example 1 except for no compound represented by Chemical Formula 4 was used during (3) preparation of the electrolyte in Example 1.

Evaluation 1

Adherence Evaluation

Adherence between an electrode and a separator of the rechargeable lithium battery cells according to Example 1 and Comparative Example 1 were measured by using a tensile force measuring device (Instron 3340), and the results are provided in the following Table 1 and FIGS. 2A and 2B. The adherence between an electrode and a separator was evaluated by measuring adherence between each positive and negative electrode and the separator.

TABLE 1

| | Adherence (N/mm) | |
|---|---|---|
| | Between positive electrode/separator | Between negative electrode/separator |
| Example 1 | 0.019 | 0.002 |
| Comparative Example 1 | 0.012 | 0.001 |

Figure 2B:

FIGS. 2A and 2B are photographs showing adherence tests between an electrode and a separator of each Example 1 and Comparative Example 1.

Referring to Table 1 and FIGS. 2A and 2B, the adherence between an electrode and a separator according to Example 1 was excellent compared with the adherence between an electrode and a separator according to Comparative Example 1. Accordingly, the adherence between an electrode and a separator was improved by adding the additive according to one embodiment to an electrolyte.

Evaluation 2

Cycle-Life Characteristic of Rechargeable Lithium Battery Cell

Figure 3:
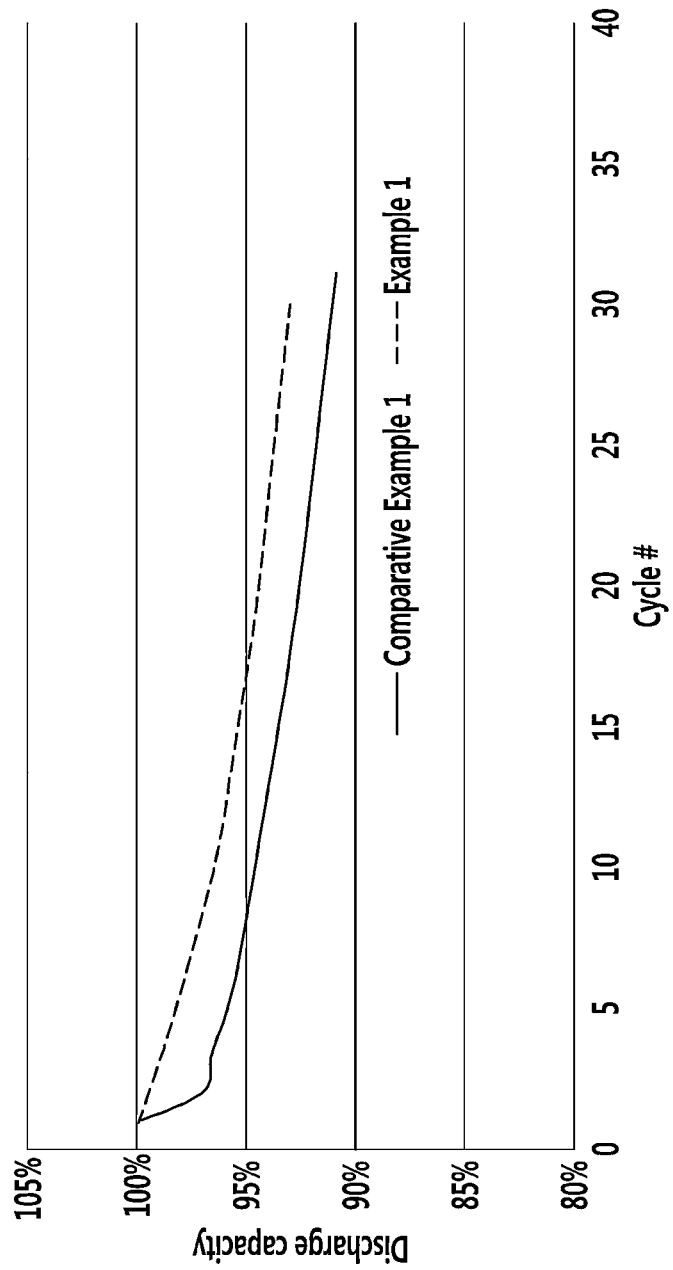
FIG. 3 is a graph showing cycle-life characteristics of the rechargeable lithium battery cells according to Example 1 and Comparative Example 1.

The rechargeable lithium battery cells according to Example 1 and Comparative Example 1 were charged and discharged under the following conditions and evaluated about cycle-life characteristic, and the results are provided in FIG. 3. Herein, the charge was performed at 1 C and 4.2V, and then, the discharge was performed at 1 C and 2.75V.

FIG. 3 is a graph showing cycle-life characteristics of a rechargeable lithium battery cells according to Example 1 and Comparative Example 1.

Referring to FIG. 3, the rechargeable lithium battery cell using an electrolyte including an additive according to Example 1 had excellent cycle-life characteristic compared with the rechargeable lithium battery cell according to Comparative Example 1.

In the present disclosure, the terms "Example" and "Comparative Example" are used arbitrarily to simply identify a particular example or experimentation and should not be interpreted as admission of prior art. While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims.

What is claimed is:

1. A rechargeable lithium battery, comprising
a positive electrode comprising a positive active material, a first binder, and a conductive material;
a negative electrode comprising a negative active material and a second binder;
a separator interposed between the positive electrode and the negative electrode and including a porous substrate having a coating layer formed on at least one side of the porous substrate; and
an electrolyte including a lithium salt, a non-aqueous organic solvent, and an additive,
wherein the coating layer comprises a fluorine-based polymer, and a ceramic, and the ceramic has an average particle diameter of about 50 μm to about 500μm, and
the additive comprises a compound represented by Chemical Formula 1:

Chemical Formula 1 wherein,
R$^1$ to R$^4$ are each independently a substituted or unsubstituted C1 to C20 alkoxy group, a substituent represented by Chemical Formula 2 or a substituent represented by Chemical Formula 3, and
at least one of the R$^1$ to R$^4$ is the substituted or unsubstituted C1 to C20 alkoxy group, and at least other one of the R$^1$ to R$^4$ is a substituent represented by Chemical Formula 2 or a substituent represented by Chemical Formula 3:

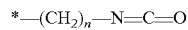

Chemcial Formula 2 wherein, n is an integer ranging from 0 to 10, and

Chemical Formula 3 wherein, n is an integer ranging from 0 to 10,
wherein the ceramic comprises Al$_2$O$_3$, MgO, TiO$_2$, Al(OH)$_3$, Mg(OH)$_2$, Ti(OH)$_4$, or a combination thereof, and wherein a bond between at least one alkoxy group of the compound represented by Chemical Formula 1 and at least one of the first binder and the second binder or the coating layer is present.

2. A rechargeable lithium battery, comprising
a positive electrode comprising a positive active material, a first binder, and a conductive material;
a negative electrode comprising a negative active material and a second binder;
a separator interposed between the positive electrode and the negative electrode and including a porous substrate having a coating layer formed on at least one side of the porous substrate; and
an electrolyte including a lithium salt and a non-aqueous organic solvent
wherein the coating layer comprises a fluorine-based polymer, and a ceramic, and an additive and the coating layer has a thickness of about 1 μm to about 10 μm, and the additive comprises a compound represented by Chemical Formula 1:

Chemical Formula 1

wherein,
$R^1$ to $R^4$ are each independently a substituted or unsubstituted C1 to C20 alkoxy group, a substituent represented by Chemical Formula 2 or a substituent represented by Chemical Formula 3, and
at least one of the $R^1$ to $R^4$ is the substituted or unsubstituted C1 to C20 alkoxy group, and at least other one of the $R^1$ to $R^4$ is a substituent represented by Chemical Formula 2 or a substituent represented by Chemical Formula 3:

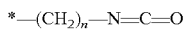          Chemcial Formula 2 wherein, in Chemical Formula 2, n is an integer ranging from 0 to 10, and

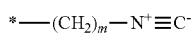          Chemical Formula 3 wherein, in Chemical Formula 3, n is an integer ranging from 0 to 10,
wherein the ceramic comprises $Al_2O_3$, MgO, $Al(OH)_3$, $Mg(OH)_2$, $Ti(OH)_4$, or a combination thereof, and
wherein a bond between at least one alkoxy group of the compound represented by Chemical Formula 1 and at least one of the first binder and the second binder or the coating layer is present.

3. The rechargeable lithium battery of claim 1, wherein the porous substrate comprise a polyolefin resin.

4. The rechargeable lithium battery of claim 1, wherein the fluorine-based polymer comprises polyvinylidenefluoride (PVdF), a polyvinylidenefluoride-hexafluoropropylene (PVdF-HFP) copolymer, or a combination thereof.

5. The rechargeable lithium battery of claim 1, wherein the ceramic is $Al_2O_3$, $Al(OH)_3$, $Mg(OH)_2$, $Ti(OH)_4$, or a combination thereof.

6. The rechargeable lithium battery of claim 1, wherein the coating layer has a thickness of about 1 μm to about 8 μm.

7. The rechargeable lithium battery of claim 1, wherein the coating layer further comprises a heat-resistance resin comprising an aramid resin, a polyamideimide resin, a polyimide resin, or a combination thereof.

8. The rechargeable lithium battery of claim 1, wherein the additive comprises a compound represented by Chemical Formula 4, a compound represented by Chemical Formula 5, or a combination thereof:

Chemical Formula 4

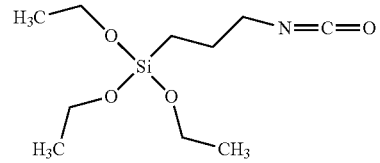

Chemical Formula 5

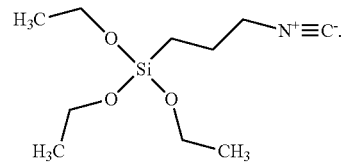

9. The rechargeable lithium battery of claim 1, wherein the compound represented by the above Chemical Formula 1 is included in an amount of about 1 part to about 15 parts by weight based on 100 parts by weight of the non-aqueous organic solvent.

10. The rechargeable lithium battery of claim 1, wherein the additive further comprises fluoroethylene carbonate, vinylethylene carbonate, propane sultone, succinonitrile, adiponitrile, or a combination thereof.

* * * * *